United States Patent [19]

Zitta

[11] Patent Number: 4,528,805
[45] Date of Patent: Jul. 16, 1985

[54] MULTI-PURPOSE LAWNMOWER ATTACHMENT

[76] Inventor: Joseph Zitta, 120 E. Mill St., Quakertown, Pa. 18951

[21] Appl. No.: 616,163

[22] Filed: Jun. 1, 1984

[51] Int. Cl.³ .......................................... A01D 55/262
[52] U.S. Cl. ................................... 56/11.6; 56/11.8; 56/13.7; 56/16.9; 56/256; 51/251
[58] Field of Search .................. 56/16.9, 13.7, 256, 56/11.6, 11.8; 51/247, 251, 241 G

[56] References Cited

U.S. PATENT DOCUMENTS

| | | | |
|---|---|---|---|
| 2,909,021 | 10/1959 | McLane | 56/16.9 |
| 3,019,585 | 2/1962 | Wellborn | 56/256 |
| 3,069,820 | 12/1962 | Ditter et al. | 51/247 |
| 3,693,334 | 9/1972 | Lowery | 56/16.9 |
| 3,871,160 | 3/1975 | Hooper | 56/16.9 |

FOREIGN PATENT DOCUMENTS 60596  3/1975  Australia ............................ 56/16.9

*Primary Examiner*—Jay N. Eskovitz
*Attorney, Agent, or Firm*—Harvey B. Jacobson

[57] ABSTRACT

A lawnmower attachment comprises a bearing assembly pivotally mounted on a lawnmower housing, and having a shaft driven from a power take-off of the lawnmower. The shaft can have an edge-cutting blade attached thereto, or the edge-cutting blade can be removed and replaced by a grinding wheel, so that the attachment can be used to sharpen the lawnmower blades or other blades. Pivotal movement of the bearing assembly connects or disconnects the shaft with the power take-off, and such movement is controlled by a hand lever on the lawnmower handle. The hand lever has a latch for releasably retaining the attachment in inoperative position.

17 Claims, 10 Drawing Figures

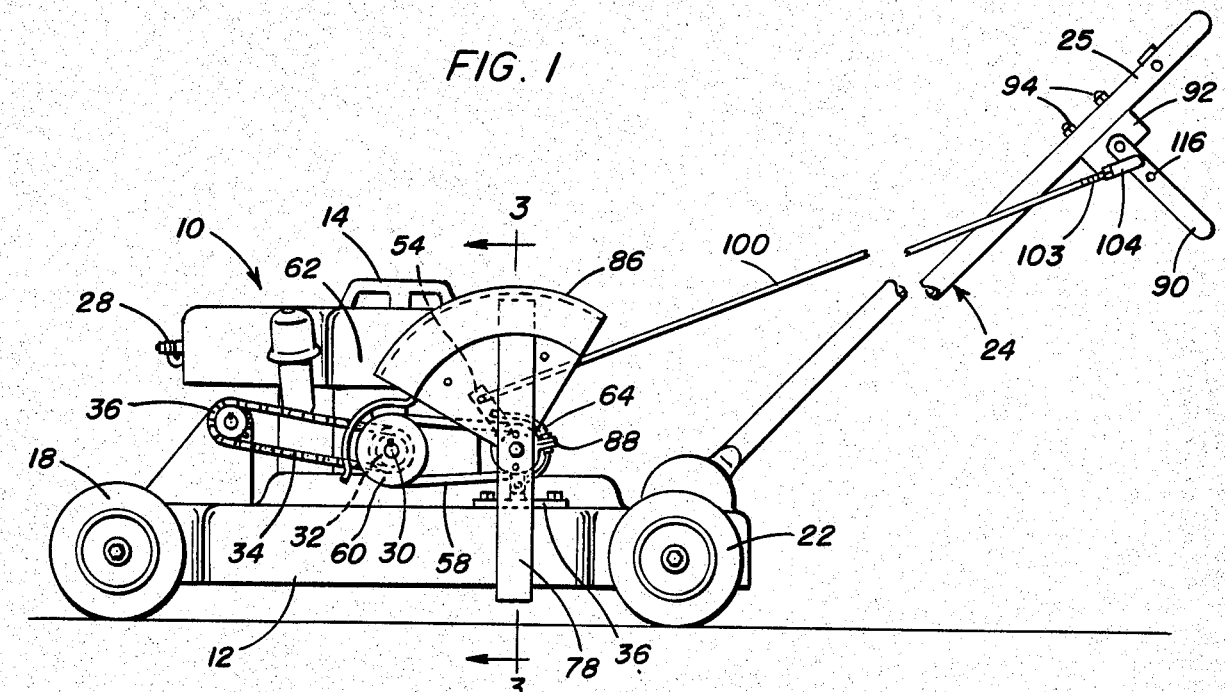
FIG. 1
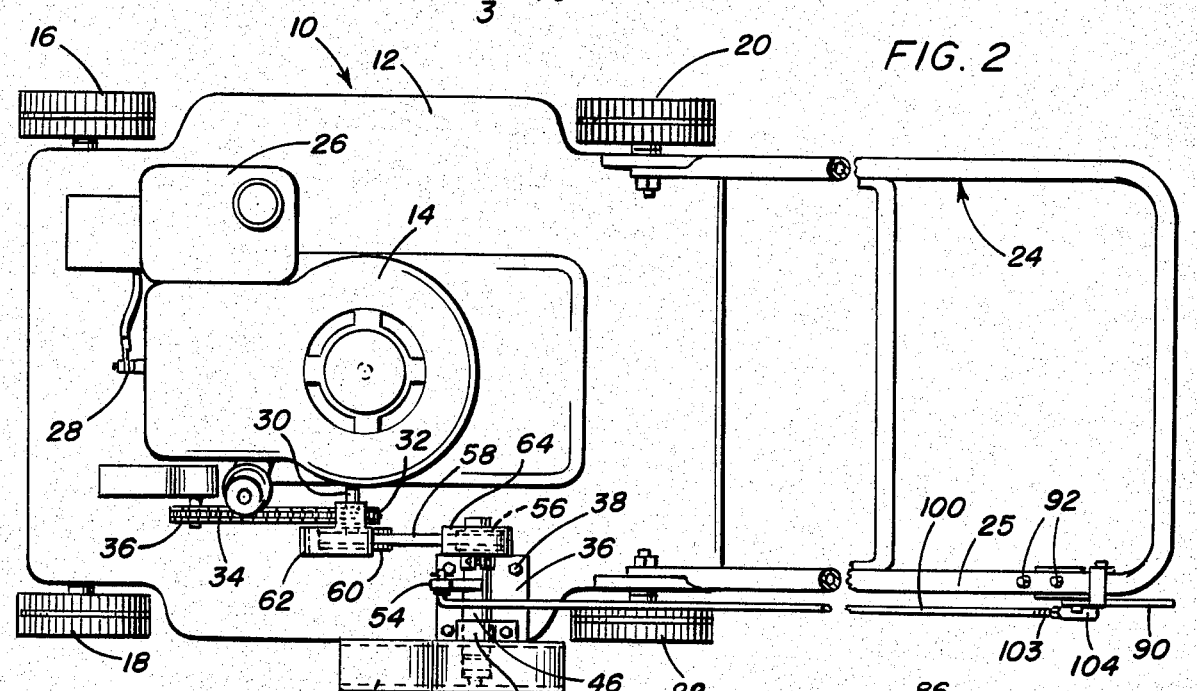
FIG. 2
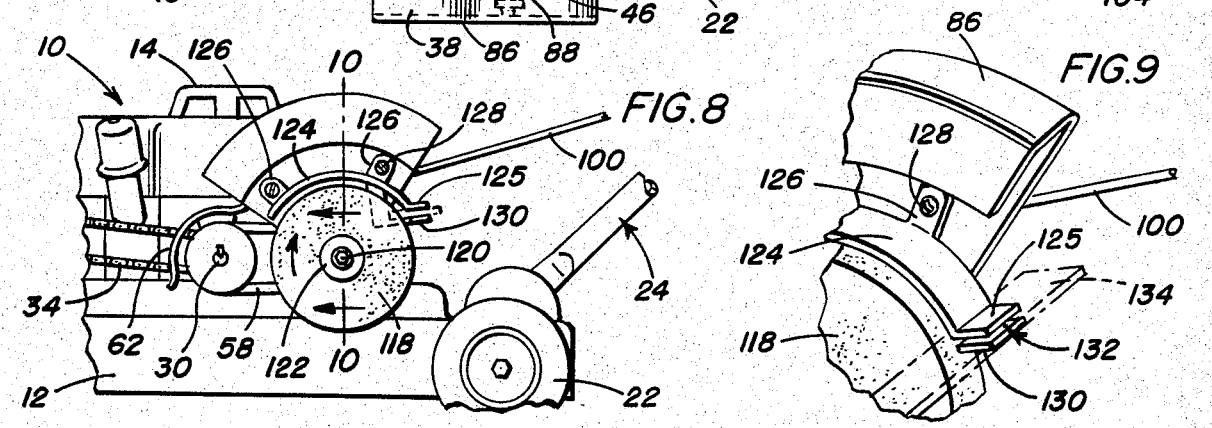
FIG. 8
FIG. 9

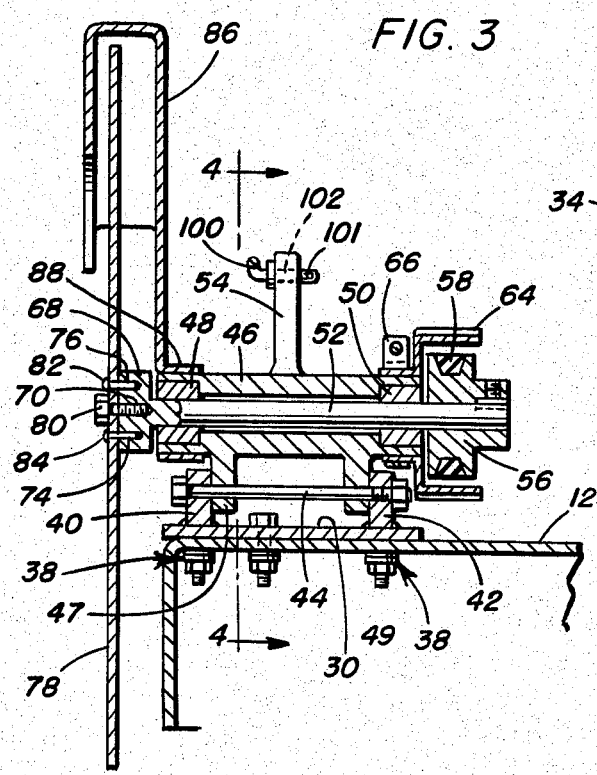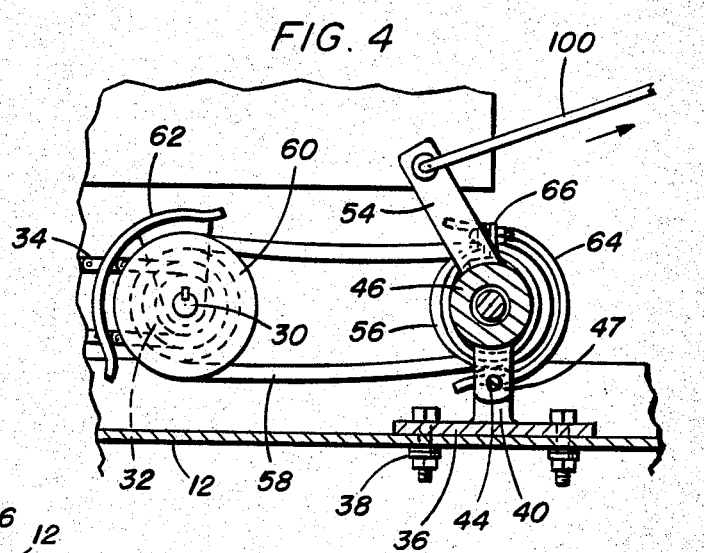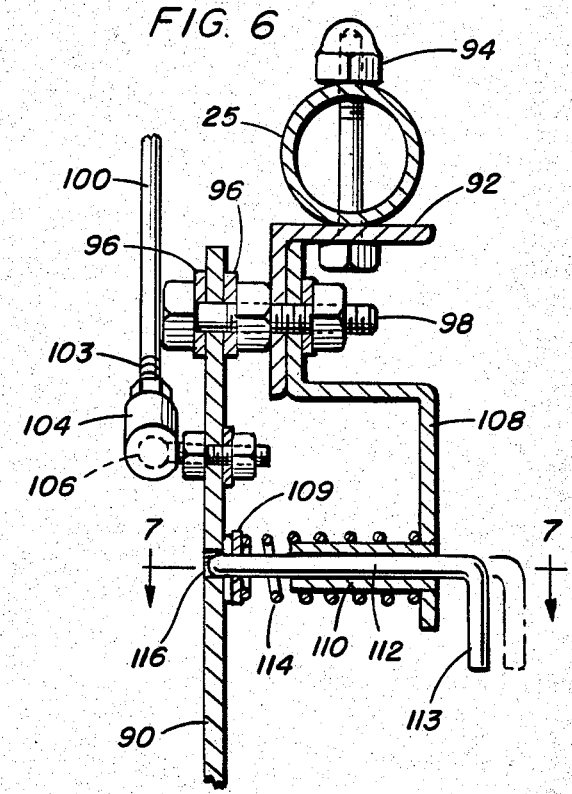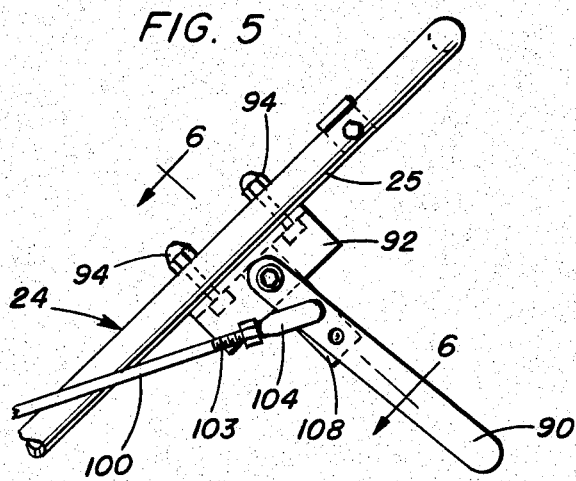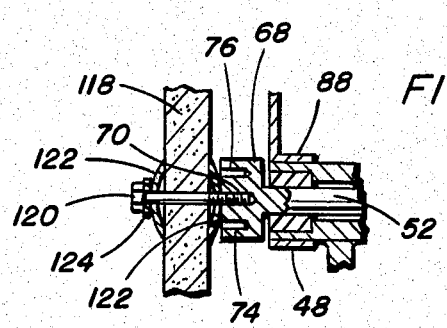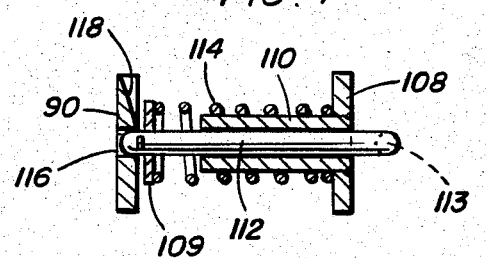

MULTI-PURPOSE LAWNMOWER ATTACHMENT

BACKGROUND OF THE INVENTION

This invention relates to an attachment for a lawnmower, to enable the lawnmower to perform an additional function or functions, other than standard mowing, for example edge-cutting or blade sharpening.

One object of the invention is to provide a simple and reliable edge-cutting attachment for a lawnmower, in which for example, the edge-cutting blade may be readily removed for replacement by another tool, such as a grinding wheel, to enable the mower to be used to sharpen its own, or other blades.

STATEMENT OF PRIOR ART

The following U.S. patents relate to lawnmower attachments and the like, none of which, however, has the features of the present invention.

U.S. Pat. No. 3,236,037
U.S. Pat. No. 3,421,300
U.S. Pat. No. 3,686,839
U.S. Pat. No. 3,693,334
U.S. Pat. No. 3,871,160

SUMMARY OF THE INVENTION

The invention provides an attachment for a lawnmower which, at least in a preferred form thereof, incorporates an edge-cutting blade which can be readily removed and optionally replaced by a grinding wheel to enable the mower to be used for grinding its own, or other blades.

The attachment may, for example, comprise a shaft carried in a bearing assembly for pivotal mounting on the exterior of a lawnmower housing under the control of an operating lever carried on the lawnmower handle and connected to the bearing assembly by a suitable linkage. The shaft has a belt-and-pulley driving connection at one end thereof with a power take-off shaft of the lawnmower, and has a hub for attachment of an edge-cutting blade (or grinding wheel) at its opposite end. Pivoting movement of the bearing assembly by means of the operating lever either raises the edge-cutting blade and disengages the driving connection, or lowers the blade to cutting position and engages the driving connection.

The edge-cutting blade can be readily replaced by the grinding wheel and the attachment may include an attachable-detachable grinding wheel guard and blade guide, as well as a safety latch for releasably holding the edge-cutting blade in a raised inoperative position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is a side elevational view of a lawnmower fitted with an edge-cutting attachment in accordance with the invention.

FIG. 2 is a plan view of the lawnmower.

FIG. 3 is an enlarged sectional view on line 3—3 of FIG. 1.

FIG. 4 is a sectional view on line 4—4 of FIG. 3.

FIG. 5 is an enlarged side elevational view of the lawnmower handle, showing a control lever for the edge-cutting attachment.

FIG. 6 is an enlarged sectional view on line 6—6 of FIG. 5.

FIG. 7 is a sectional view on line 7—7 of FIG. 6.

FIG. 8 is a part side elevational view of the lawnmower similar to FIG. 1, but showing the edge-cutting blade replaced by a grinding wheel.

FIG. 9 is a part perspective view of the grinding wheel and a grinding wheel guard assembly.

FIG. 10 is a sectional view on line 10—10 of FIG. 8.

DESCRIPTION OF PREFERRED EMBODIMENT

The drawings illustrate a conventional form of rotary lawnmower 10 having a generally rectangular box-like housing 12 under which is rotatably carried a standard lawnmower cutter blade (not shown) driven by a motor 14 atop the housing. The housing has wheels 16, 18, 20, 22 at the respective corners, and means (to be described) for driving front wheels 16, 18. Also shown is a conventional upwardly extending yoke-shaped handle 24 connected between rear wheels 20, 22, a fuel tank 26, and a spark plug 28. Motor 14, apart from driving the cutter blade, also has a power take-off shaft 30 which drives the front wheels, in known manner, through a chain-and-sprocket drive including a sprocket 32 on shaft 30, a chain 34, and a sprocket 36. A further chain and sprocket (not shown) is drivingly connected between sprocket 36 and the front wheels.

The components of the lawnmower thus far described are of a conventional nature, and will not therefore be described in greater detail.

In accordance with the invention, the lawnmower is provided with an attachment which can be adapted either for use as an edge-cutting attachment, or as a grinding attachment. Thus, the attachment includes a mounting bracket 36 for securement on top of the lawnmower by nut-and-bolt assemblies 38 (after drilling suitable holes through the housing) the bracket providing spaced supports 40, 42 for a pivot pin 44 (see FIG. 3) which carries a pivotal tubular bearing assembly 46 on arms 47 and 49. Assembly 46 has bearing bushes 48, 50 at its opposite ends in which is journaled a driven shaft 52. Assembly 46 may be pivoted about pin 44 by means of a pivot arm 54 extending from the journal assembly. At its inner end, shaft 52 supports a pulley 56 engaging a drive belt 58, driven by a pulley 60 on power take-off shaft 30 of the lawnmower. Pulley 60 and sprocket 32 may be a unitary element suitably keyed on the power take-off shaft. Suitable pulley and drive guards 62, 64 may be provided at opposite ends of belt 58, guard 62, for example, being secured around the power take-off shaft, and guard 64 being secured around assembly 46 by a screw-up collar 66 or the like.

At its outer end, shaft 52 is formed with a mounting hub 68 (FIGS. 3 and 10) having a centrally threaded bore 70 and a pair of smaller diametrically opposed guide bores 74, 76. An edge-cutting blade 78 may be releasably attached to the hub with a single central bolt 80 threaded into bore 70, and locating pins 82, 84 fitted in bores 74, 76. A segment-shaped cutter guard 86 may be fitted around assembly 48 by means of a screw-up collar 88 or the like.

In the position of bearing assembly 46 shown in FIGS. 1 and 4, shaft 52 is vertically above pivot pin 44, belt 58 is slack so that no drive is transmitted to pulley 56 and shaft 52, and blade 78 is in a raised inoperative position. By pivotally moving the bearing assembly in a clockwise direction, however, by means of arm 54, the blade is lowered to cutting position, and pulley 56 applies tension to belt 58 in order to transmit drive to the shaft 52 thereby rotating the edge-cutting blade.

Pivoting movement of the bearing assembly 46 is controlled by a hand lever 90 pivoted on a bracket 92 secured at the upper end of upright 25 of handle 24. As shown particularly in FIG. 6, bracket 92 may be secured to the upright by bolt-and-nut assemblies 94 extending through suitably drilled holes, and the hand lever may be pivoted between washers 96 on a bolt 98 extending through bracket 92. The hand lever is connected to arm 54 of bearing assembly 46 by means of an elongate rod 100, the lower end 101 of which is bent over and fitted in an opening 102 in arm 54 (see FIG. 3), and the upper end 103 of which is threaded into a female element 104 of a swivel fitting having an interfitting male element 106 (FIG. 6) bolted to the hand lever. The threaded swivel fitting allows for a degree of length adjustment of rod 100, for adjusting the tension applied to belt 58, or the exact cutting height of blade 78, for example. It will be noted that pulling up on the hand lever (in the direction indicated by the arrow of FIG. 1) serves to operate the edge-cutting blade, while movement of the hand lever in the opposite direction terminates its operation.

The attachment also has a safety means for releasably latching the cutting blade in inoperative raised position (the position of bearing assembly 46 shown in FIGS. 1 and 4). Thus, referring particularly to FIGS. 6 and 7, it will be noted that bracket 92 carries an angled holder 108 on bolt 98 for a tube 110 in which is mounted a longitudinally movable latching pin 112. The pin is urged outwardly toward hand lever 90 by means of a coil spring 114 surrounding the tube and acting between holder 108 and a washer 109 secured toward the nose end of pin 112. Lever 90 has a latching opening 116 with an adjacent ramp surface 118, and the arrangement and configuration of the parts is such that pin 112 snaps into the latching opening when the hand lever is in the down position (FIGS. 1 and 5) i.e. when edge-cutting blade 78 is in raised inoperative position. Thus, the cutting blade is retained in inoperative raised position during normal use of the lawnmower, and when operation of the edge-cutting blade is required, it is necessary to withdraw pin 112 from opening 116, by pulling on the cranked end 113 of the pin, to allow the hand lever 90 to be raised, thereby pivoting bearing assembly 46.

It will be seen from the foregoing that the invention, as thus far described, provides a simple to operate attachment, with few moving parts, for providing a lawnmower with an auxiliary tool, such as an edge-cutting blade.

In accordance with a further feature of the invention, the edge-cutting blade 78 can be readily removed from hub 68, simply by removal of the single bolt 80, for replacement by another power tool, such as a grinding wheel 118, see FIGS. 8, 9 and 10. The grinding wheel may also be readily attached to hub 68 by a single bolt 120, with interposed stone-cushioning washers 122 and a spring washer 124. Further, a bolt-on grinding wheel guard 124 may also be provided having lugs 126 for screws 128, which engage suitably located openings (not shown) in the cutter guard 86. One end 125 of guard 124 may be bent and cooperate with an extension piece 130 secured to the guard, to define a slot 132 (FIG. 9) defining a guide for a workpiece 134 being sharpened. It will be understood that provision of the grinding wheel for attachment to hub 68 provides the lawnmower with a unique facility of being able to sharpen its own (or other) blades. The depth and angle of slot 132 may, for example, be set to provide for proper sharpening of the mower blades, or the extension piece may also be adjustable to provide a guide suited to different blades and the like. It will be understood that operation of the grinding wheel is controlled by hand lever 90 in the same manner as operation of the edge-cutting blade.

A lawnmower attachment in accordance with the invention is of simple construction, is compact and creates minimum interference with standard mower operation. The attachment is relatively maintenance free, light in weight, simple to operate and install, and provides a unique facility for using the mower to operate different power tools, such as an edge-cutting blade, or grinding wheel, with extremely simple substitution of the respective tools. Accordingly, the invention provides an extremely useful lawnmower adjunct.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A lawnmower attachment comprising a rotary shaft, means for mounting the shaft on the lawnmower for powered rotation of the shaft from the lawnmower power source independently of power supplied to a standard lawnmower blade, a mounting hub on the shaft for receipt of a powered auxiliary lawnmower tool, an edge cutting blade for selective mounting on the hub, a grinding wheel for selective mounting on the hub in replacement of the edge-cutting blade, whereby the lawnmower may be used selectively to perform alternative functions auxiliary to standard mowing, a first guard for the edge-cutting tool, a second smaller guard for the grinding wheel, and means for releasably securing the second guard in operative position on the first guard.

2. The invention of claim 1 wherein the second guard includes a grinding guide for properly positioning a workpiece for grinding against the surface of the grinding wheel.

3. The invention of claim 2 wherein the grinding guide is set for properly positioning a lawnmower blade for grinding against the grinding wheel surface.

4. The invention of claim 1 wherein the shaft mounting means comprises a pivotal shaft bearing assembly having a pulley connection with a belt drive from the power source, the attachment including control means for pivoting the assembly between an inoperative position slackening the belt so that no power is transmitted to the pulley, and an operative position wherein the belt is tensioned for supplying power to the pulley.

5. The invention of claim 4 wherein the control means comprises a hand lever for mounting on the lawnmower handle, and linkage means connecting the hand lever with the bearing assembly.

6. The invention of claim 5 including safety latch means engageable with the hand lever for releasably retaining the bearing assembly in inoperative position.

7. In a lawnmower comprising a box-like lawnmower housing having front and rear wheels at respective corners of the housing, a lawn-cutting blade rotatably mounted under the housing, a drive motor atop of the housing, a drive connection between the motor and the blade, and the motor having a horizontal power take-off shaft above the housing, the improvement comprising attachment means for an auxiliary lawnmower tool, the attachment means including a rotary drive-imparting element on said power take-off shaft, a mounting bracket fixed atop the lawnmower housing between the front and rear wheels, a bearing assembly pivotally mounted on said bracket for back and forth pivotal movement about a pivot axis parallel to the axes of the lawnmower wheels, a shaft rotatably received in the bearing assembly, the shaft having an inboard end, an outboard end extending at one side of the housing, and a shaft axis parallel to the pivot axis, a drive-receiving element on the inboard end of the shaft, an endless drive-transmitting element connected between the drive-imparting element and the drive-receiving element, means for attaching an auxiliary rotary lawnmower tool to the outboard end of the shaft, and control means for pivotally moving the bearing assembly between an inoperative position wherein the drive-transmitting element is slackened so that no power is transmitted to the shaft, and an operative position wherein the drive-transmitting element is tensioned by the drive-receiving element to transmit rotary power to the shaft, the control means including a manually operable lever on a handle part of the lawnmower and linkage means connecting the lever to the bearing assembly.

8. The invention of claim 7 including drive means connected between the power take-off shaft and the front wheels of the lawnmower, and wherein said bracket and bearing assembly are mounted atop the housing between the power take-off shaft and the rear wheels of the lawnmower.

9. The invention of claim 7 wherein the bearing assembly comprises a tubular member with bearing bushes at its opposite ends receiving the shaft, a pair of depending arms each having a pivot connection with a corresponding support extending from said bracket, and a pivot arm extending from the tubular member for connection to the control means.

10. The invention of claim 7 wherein said tool comprises an edge-cutting blade, wherein in the operative position of the drive-receiving element, the axis of said shaft is vertically above the pivot axis so that movement of the drive-receiving element between the inoperative and operative positions lowers the cutting blade into operative cutting position, and movement of the drive-receiving element between the operative and inoperative positions raises the cutting blade to an inoperative position.

11. The invention of claim 7 wherein the control means includes safety means for releasably latching the bearing assembly in the inoperative position of the drive-receiving element.

12. The invention of claim 11 wherein the safety means comprises a latching pin adapted to engage in a latching opening in the hand lever when the lever is in a location establishing the inoperative position of the drive-receiving element.

13. The invention of claim 12 including spring means urging the latching pin toward engagement in said latching opening, the pin engaging the opening when the hand lever is brought to said location, and means for withdrawing the pin from the opening against the action of the spring means.

14. The invention of claim 10 including a further auxiliary lawnmower tool in the form of a grinding wheel for releasable attachment to the shaft.

15. The invention of claim 13 wherein the shaft has a hub at one end, and each of said tools attaches selectively to the shaft by means of a single bolt threaded into a central bore formed in the hub.

16. The invention of claim 14 including a first segment-shaped guard for the edge-cutting tool, a second circumferential guard for the grinding wheel, and means for releasably attaching the second guard to the first guard in operative position around the grinding wheel.

17. The invention of claim 16 wherein the second guard includes means defining a guide for holding a workpiece in proper grinding position against the surface of the grinding wheel.

* * * * *